United States Patent [19]

Denis

[11] Patent Number: 4,817,692
[45] Date of Patent: Apr. 4, 1989

[54] RING SAW

[75] Inventor: Laurent Denis, Ste. Rosalie, Canada

[73] Assignee: Equipements Denis Inc., St. Hyacinthe, Canada

[21] Appl. No.: 238,147

[22] Filed: Aug. 30, 1988

[30] Foreign Application Priority Data

Sep. 2, 1987 [CA] Canada .................................... 545994

[51] Int. Cl.$^4$ .............................................. A01G 23/08
[52] U.S. Cl. ...................................... 144/3 D; 30/389; 83/469; 83/835; 144/34 R; 144/241; 144/336
[58] Field of Search ..................... 30/389; 83/469, 591, 83/592, 594, 839, 840, 835; 144/3 D, 34 R, 241, 336

[56] References Cited

U.S. PATENT DOCUMENTS 1,646,812 10/1927 Davey.
3,135,304 6/1964 Breer et al. ............................ 30/389
3,872,901 3/1975 Bernard.
3,915,209 10/1975 Bernard.
4,013,106 3/1977 Albright.
4,593,733 6/1986 Hamilton ............................ 144/336

FOREIGN PATENT DOCUMENTS 1140029 1/1983 Canada ............................. 144/34 R
2347458 4/1974 Fed. Rep. of Germany .... 144/34 R
2361030 6/1974 Fed. Rep. of Germany .... 144/34 R Primary Examiner—W. Donald Bray
Attorney, Agent, or Firm—Shlesinger & Myers

[57] ABSTRACT

An improved ring saw having a disk-shaped saw body with a cutting ring mounted to rotate about the saw body. The cutting ring has an inwardly directed flange that fits within a slot in the peripheral edge of the saw body. Cutting teeth are mounted in the ring. Drive means mounted on the saw body rotate the cutting ring about the saw body to have the saw cut into a tree as the saw body is moved toward the tree.

11 Claims, 5 Drawing Sheets

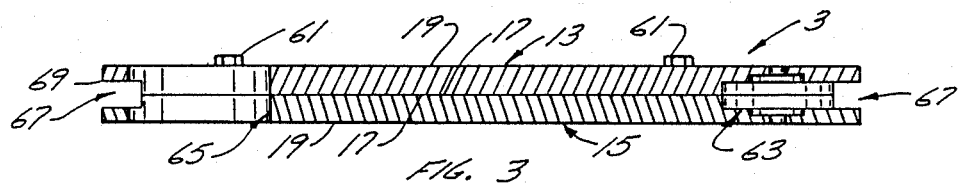
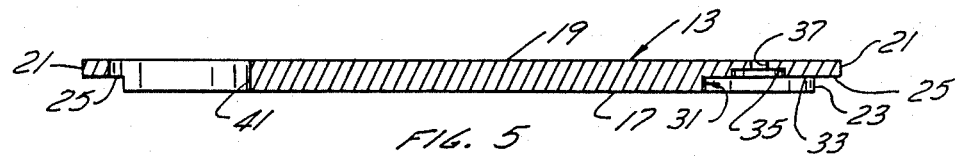
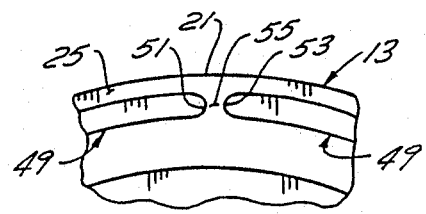
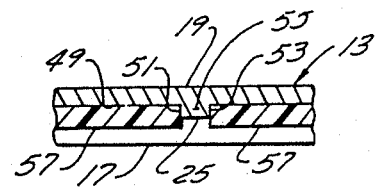
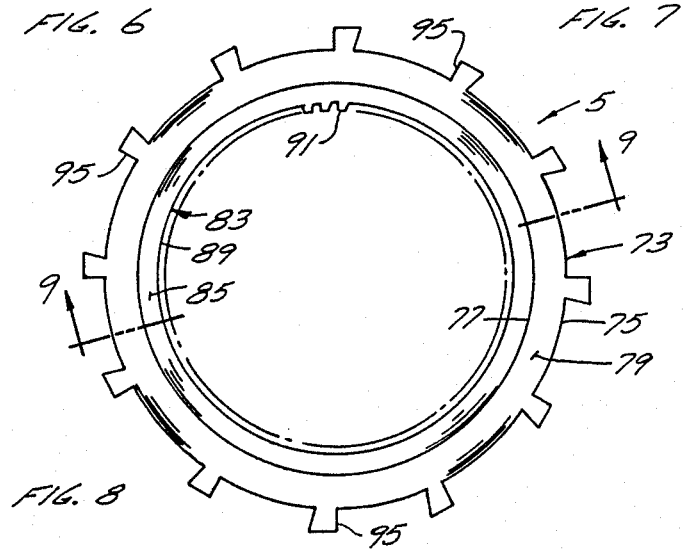
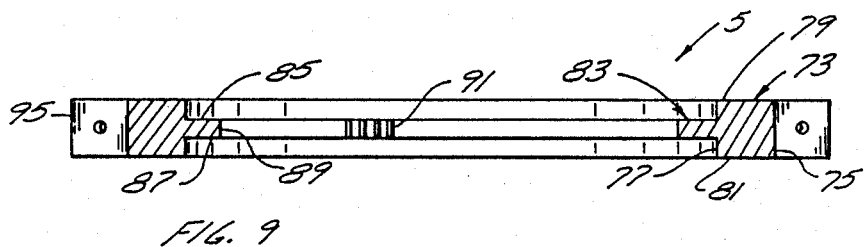

RING SAW

BACKGROUND OF THE INVENTION

1. FIELD OF THE INVENTION

This invention is directed toward an improved ring saw.

2. DESCRIPTION OF THE PRIOR ART

Ring saws have a cutting ring rotatably mounted about the outer periphery of a circular disk saw body. Means are provided on the saw body for rotating the ring about the saw body. As the ring is rotated, cutting teeth mounted on the ring make a cut wide enough to receive both the ring and the saw body. The saw body is moved forward in the cut as the ring is rotated to cut through an object such as a tree. A known ring saw is shown in U.S. Pat. No. 3,915,209 by way of example.

Ring saws have the advantage over disk or circular saws in requiring less power to operate them since only an outer ring, instead of an entire disk, requires rotation. However the known ring saws have disadvantages. There is difficulty in mounting the ring saw on the saw body to take stresses such as those applied by a cut tree resting on the saw. There is also difficulty in protecting the drive means, for rotating the ring about the saw body, from dirt and debris. The cutting teeth on known ring saws are also easily damaged and it is difficult to replace the damaged cutting teeth on the ring.

SUMMARY OF THE INVENTION

It is the purpose of the present invention to provide an improved ring saw that eliminates, or at least minimizes the disadvantages of known ring saws. The ring saw of the present invention has the cutting ring mounted on the saw body in a manner that permits it to carry higher loading, in a direction generally parallel to the axis of rotation of the ring, than known ring saws. The saw also has a construction that protects the drive means for the ring from dirt and debris in a better manner than known ring saws. In addition, means are provided for lubricating the drive means in a better manner. The ring saw of the present invention also has cutting teeth constructed and mounted on the ring in a manner permitting higher cutting stresses, and easier replacement.

The ring saw of the present invention is simple in construction and assembly, yet sturdy and reliable in operation, and easily serviced.

The present ring saw employs a circular, disk-shaped, saw body having a slot or groove about its circular peripheral edge that extends radially inwardly. The cutting ring is adapted to be mounted about the peripheral edge of the saw body and the ring has a radially inwardly extending flange that fits within the slot. Bearing means are provided between the sides of the slot and the flange to securely, rotatably mount the ring on the saw body. The slot-flange mounting arrangement permits the cutting ring t better withstand structural loading in the axial direction of the ring.

The saw body has drive means mounted thereon for centering and rotating the cutting ring about the saw body. The drive means are partly located within the slot and cooperate with driven means on the inner edge of the flange on the cutting ring to rotate the ring. With the drive and driven means for the ring located within the slot, they are more easily protected from dirt and debris. Bearing means for the cutting ring are also located within the slot, mounted in the side walls of the slot to bear against the sides of the flange. The bearing means are also located between the drive and driven means, and the mouth of the slot, to further protect the drive and driven means from dirt and debris. The saw body is provided with lubricating channels for providing lubrication to the drive and guide means while minimizing the entry of dirt and debris.

The cutting teeth are securely mounted on the outer peripheral edge of the cutting ring. The cutting ring is provided with an integral, radially outwardly extending projection for mounting each tooth. Each tooth is bolted to a mounting projection in a manner to have the tooth abut both the projection and the peripheral edge of the ring. Each tooth, and its related mounting, is also designed to direct cutting forces radially into the ring as well as tangentially of the ring. A single, easily accessible, bolt mounts each tooth to a projection on the ring making tooth replacement quick and simple.

Other minor improvements are provided in the ring saw for making it stronger, easier to service, and more efficient in operation, as will be described.

The invention is particularly directed toward an improved ring saw having a circular, disk-shaped saw body and a cutting ring mounted about the circular peripheral edge of the saw body. Cutting teeth are mounted on the cutting ring. Drive means are provided on the saw body for rotating the cutting ring about the saw body. The saw body has a annular slot in its peripheral edge that extends radially inwardly. The cutting ring has an annular, radially inwardly directed, flange on its inner circumferential surface that extends into the slot in the saw body. Driven means on the inner surface of the flange cooperate with the drive means on the saw body to rotate the ring.

BRIEF DESCRIPTION OF THE DRAWINGS

FIG. 3 is a cross-section view of the saw body taken along line 3—3 of FIG. 2;

FIG. 5 is a cross-section view of the saw body plate taken along line 5—5 of FIG. 4;

FIG. 6 is a detail plan view of the saw body plate showing detail of the bearing grooves;

FIG. 7 is a detail cross-section view of the saw body plate with bearings installed in the grooves;

FIG. 8 is a plan view of the cutting ring;

FIG. 9 is a cross-section view of the cutting ring taken along line 9—9 of FIG. 8;

Figure 1:
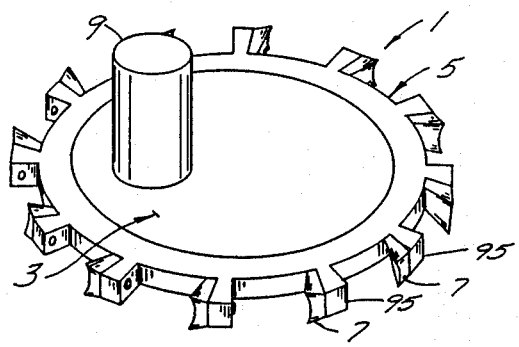
FIG. 1 is a perspective view of the improved ring saw.

The ring saw 1 of the present invention, as shown in FIG. 1, is of the type having a fixed, circular, saw body 3 with a cutting ring 5 mounted about the circumference of the saw body 3. The cutting ring 5 carries cutting teeth 7 sized to cut a kerf in a tree which is slightly wider than the thickness of the ring or the thickness of the saw body. Drive means 9 are mounted on the saw body 3 for rotating the ring 5 about the saw body 3 to cut a tree as the saw is moved into the tree.

Figure 4:
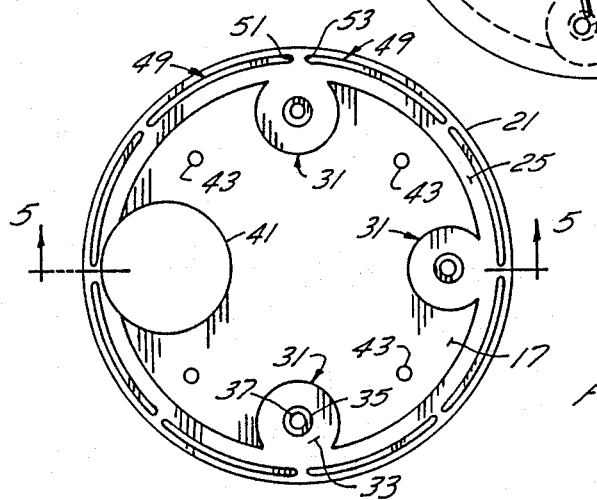
FIG. 4 is a bottom view of one plate of the saw body.

In more detail, as shown in FIGS. 2 to 5, the saw body 3 has a circular, disk-shape and comprises a pair of circular body plates 13, 15 that are connected together face-to-face. For the purposes of the description only, one of the body plates 13 will be referred to as the top body plate, and the other body plate 15 will be referred to as the bottom body plate. Both plates 13, 15 are similar so only one will be described in detail. The top body plate 13, as shown in FIGS. 4 and 5, comprises a relatively thin, circular disk having an inner surface 17 and an outer surface 19. The inner face 17 of the plate 13 is undercut near its outer edge 21 as shown at shoulder 23 to form a circular track 25 extending about the plate. This track 25 is parallel to the inner and outer faces 17, 19.

Three shallow, blind cylindrical guide holes 31 extend inwardly into the plate 13 from its inner face 17. Guide holes 31 are located the same distance from the center of the plate 13 and are spaced ninety degrees apart. Each guide hole 31 intersects the circular track 25 and has its bottom wall 33 in the same plane as the track 25. Each blind, guide hole 31 has a shallow counterbore 35. A small hole 37 in the center of each blind guide hole 31 extends through the plate 13. Each blind guide hole 31 forms part of a guide pocket as will be described.

A large cylindrical drive hole 41 extends through the plate 13. The through drive hole 41 is slightly larger than the blind guide holes 31 and is located diametrically opposite the middle of the three blind guide holes 31 and spaced ninety degrees from the other two blind guide holes 31. The drive hole 41 also intersects the track 25. Threaded bolt holes 43 are provided in the plate 13 located between the guide and drive holes 31, 41 and inside of the track 25. The bolt holes 43 are for use in connecting the body plates together.

A series of shallow bearing grooves 49 is provided in the track 25 of the plate 13 adjacent the outer edge 21 of the plate. Each groove 49 is in the form of a segment of a narrow ring. The grooves 49 are arranged end 51 to end 53, as shown in FIG. 6, with a narrow land 55 between adjacent grooves, to form a broken bearing circle in the plate 13 adjacent the outer edge 21. Bearing strips 57, having the same shape as the bearing grooves 49, are mounted in the grooves, as shown in FIG. 7, and project just above the track 25 to support the cutting ring 5 as will be described. The bearing strips 57 are made from a suitable plastic material having a low coefficient of friction. Preferably, the bearing strips 57 are sized to be frictionally held in the grooves 49.

Figure 2:
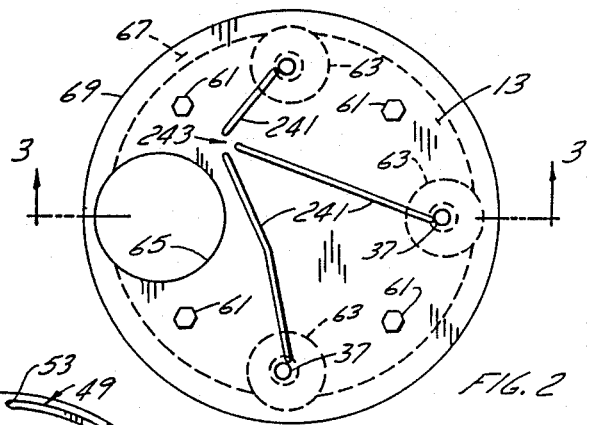
FIG. 2 is a plan view of the saw body.

The saw body 3 is formed by joining the two body plates 13, 15 together, with their inner faces 17 abutting, and with bolts 61 passing through the bolt holes 43 as shown in FIGS. 2 and 3. With the plates 13, 15 joined together, the aligned, blind guide holes 31 in both plates form three guide pockets 63 in which guide means for maintaining the cutting ring 5 in position are mounted as will be described. With the plates 13, 15 joined together, the cylindrical drive holes 41 are also aligned one over the other to form a drive opening 65. The tracks 25 in the two plates 13, 15 are located opposite each other but spaced apart to form a slot 67 extending radially inwardly from the outer edge 69 of the saw body 3. The slot 67 extends about the saw body 3 and intersects with the drive opening 65 and the three guide pockets 63. The cutting ring 5 is partly mounted within the slot 67 to rotate about the saw body as will be described.

The cutting ring 5, as shown in FIGS. 8 and 9, has a flat, ring-shaped body 73 having an outer circular surface 75, and inner circular surfaces 77, and top and bottom annular sides 79, 81. An annular flange 83 extends inwardly from the inner surface 77 of the main body 73, the flange 83 being centered with respect to the inner surface 77, and integral with the main body 73. The flange 83 itself has top and bottom annular sides 85, 87 and an inner circular surface 89. The inner surface 89 of the flange 83 carries driven means in the form of gear teeth 91 cut into the flange.

Figure 10:
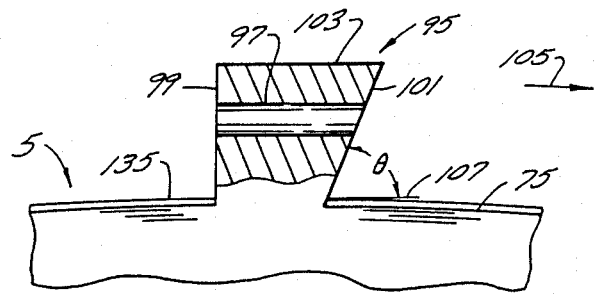
FIG. 10 is a cross-section of the cutting ring showing a mounting projection in detail.

Short tooth-mounting projections 95 extend radially outwardly from the outer surface 75 of the ring 5 and are spaced circumferentially about the ring. Preferably, the mounting projections 95 are spaced apart about thirty degrees. Each projection 95 has a through hole 97 extending tangentially of the ring 5, as shown in FIG. 10. The hole 97 extends between the ends 99, 101 of the projection 95 and is generally parallel to the top 103 of the projection. The end 101, facing in the direction that the ring rotates during use, as shown by the arrow 105, is set at an angle of about seventy five degrees to the tangent line 107 where the end 101 meets the outer surface 75 of the ring.

Figures 11, 12, 13:
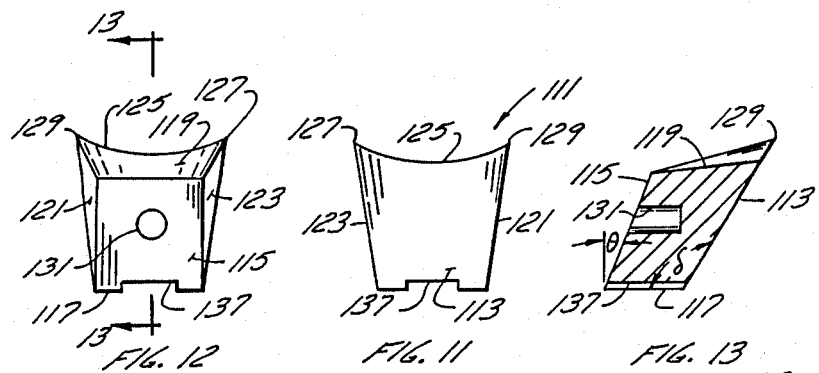
FIG. 11 is a front view of a cutting tooth.
FIG. 12 is a rear view of a cutting tooth.
FIG. 13 is a cross-section view of a cutting tooth taken along line 13—13 of FIG. 12.

A cutting tooth 111 is mounted in each mounting projection 95. Each tooth, as shown in FIGS. 11 to 13, has the general shape of a six-sided block with a front or leading face 113, a rear mounting face 115, a bottom or inner mounting face 117, a top or outer face 119 and two side faces 121, 124. The inner mounting face 117 of the tooth 111 is flat. The rear mounting face 115 of the tooth 111 is also flat and extends at an angle of about seventy five degrees to the inner mounting face 117. The leading face 113 of the cutting tooth 111 is set at an angle of about one hundred and fifty degrees to the inner mounting face 117 and thus slopes forwardly slightly more than the rear face 115. The slope of both the front and rear faces can vary about ten degrees to either side so long as the front face always slopes slightly more than the rear face. The leading face 113 is slightly larger than the rear face 115.

A cutting edge 125 is formed on the tooth 111 where the leading face 113 of the tooth meets the outer face 119. The cutting edge 125 is concave, sloping down from two outer cutting corners 127, 129. The outer face 119 of the tooth slopes downwardly from the leading face 113 to the rear face 115. The two side faces 121, 123 slope inwardly from the outer face 119 to the inner face 117. A threaded hole 131 is provided in the tooth extending inwardly from the rear face 115 and also extending generally parallel to the inner face 117.

Figure 14:
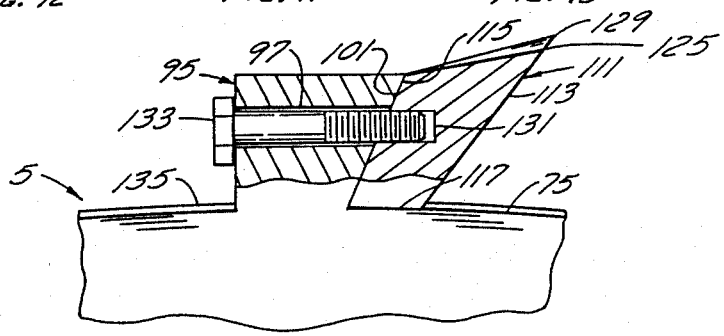
FIG. 14 is a detail side view showing a cutting tooth mounted on the cutting ring.

Each tooth 111 is mounted on a projection 95 of the cutting ring 5 with a bolt 133, as shown in FIG. 14.

With the inner mounting face 117 of the tooth 111 resting on the outer surface 75 of the ring, and with the rear mounting face 115 flush against the end wall 101 of the projection 95, the threaded hole 131 in the tooth 111 is generally aligned with the through hole 97 in the projection, and the cutting edge 125 faces in the direction that the ring rotates. Preferably, the through hole 97 is made slightly larger than the bolt 133 to ensure that the tooth will rest solidly against both the edge 75 of the ring, and end wall 101 of the projection 95, while still leaving clearance for the bolt 133 to thread into hole 131 in the tooth 95. The bolt 133 passes through hole 97 and threads into the hole 131 in the tooth 111 to securely lock the tooth 111 to the projection 95. When the tooth 111 is mounted in place, it is centered with respect to the cutting ring 5. Preferably, the outer surface 75 of the ring 5 is provided with a low, wide central rib 135 extending between the projections 95. Each tooth 111 is provided with a wide shallow central groove 137 in its bottom face 117. The rib 135 ensures that each tooth 111 is centrally mounted on the ring 5.

The cutting edge 125 of each tooth is just slightly wider than the saw body 3, projecting laterally just past the outer faces 19 of plates 13, 15 making up the saw body 3 when the ring 5 is mounted on the saw body. The inner face 117 of each tooth 111 is about the same width as the outer surface 75 of the ring 5. With the cutting edge 125 made wider than the saw body 1, and with the sides 121, 123 of the tooth 111 sloping inwardly from its outer face 119 to its inner face 117, the ring 5 rotates within the cut being made without hindrance and thus avoids any braking effect.

Figure 15:
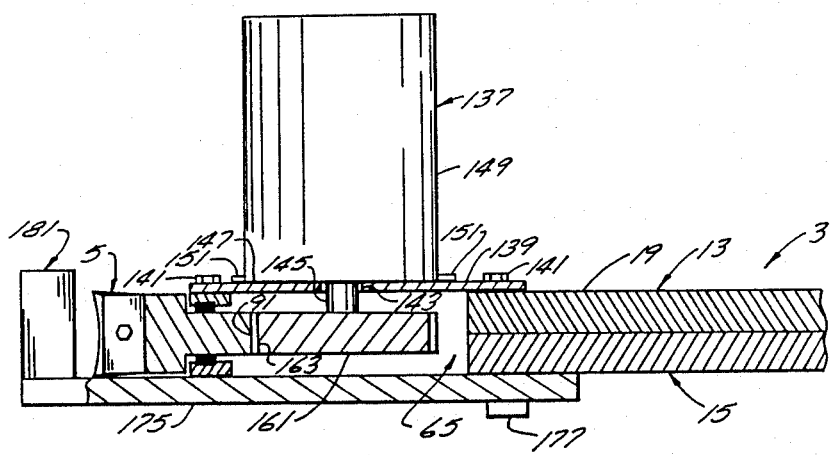
FIG. 15 is a partial cross-section view showing the mounting of the drive means on the saw body.
Figure 16:
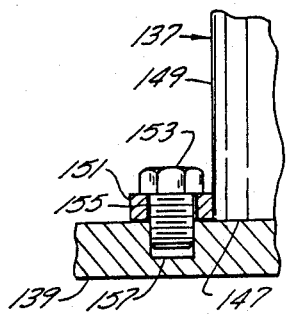
FIG. 16 is a detail cross-section view of the drive means mounting.

The drive means 9 includes a drive motor 137 mounted on one side of the saw body 3 as shown in Figs. 15 and 16. An annular mounting plate 139 is mounted on the outer face 19 of the top plate 13 of the saw body 3 with bolts 141. The mounting plate 139 closes most of the top of the drive opening 65. A central opening 143 in the mounting plate 139 is aligned with the drive opening 65. The drive motor 37 has a drive shaft 145 projecting from one end 147 of its casing 149. Mounting flanges 151 extend radially from the one end 147 of the casing 149. Bolts 153 pass through holes 155 in the flanges 151 and into threaded holes 157 in the mounting plate 139 to connect the motor 137 to the plate 139 with its one end 147 against the plate 139 and with the drive shaft 145, passing through opening 143 in the plate 139, centrally located in the drive opening 65. A drive gear 161 is keyed to the shaft 145, after the motor 137 is mounted in place, and is centrally located within the drive opening 65. The drive gear 161 has gear teeth 163 cooperating with the gear teeth 91 on the cutting ring 5 as will be described.

Figure 17:
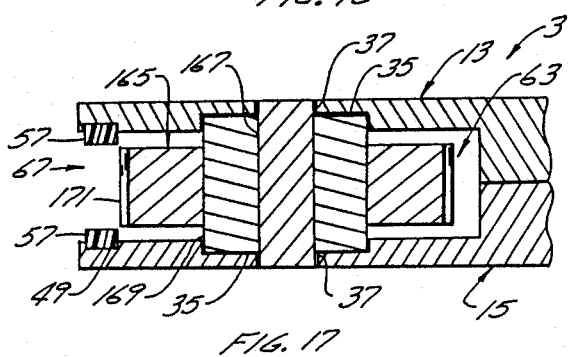
FIG. 17 is a detail cross-section view of the idler gear mounting.

The drive means 9 also includes three idler gears 165, one mounted in each guide pocket 63. Each idler gear 165 as shown in FIG. 17, has a short stub shaft 167 adapted to be fixedly mounted in the holes 37 in the top and bottom plates 13, 15 in each pocket 63. Bearings 169 rotatably mount the gear 165 to the shaft 167, the bearings 169 located in the counterbores 35 in the pockets 63. The teeth 171 on each idler gear 165 cooperate with the gear teeth 91 on the cutting ring 5 as will be described.

The saw body 3 is adapted to be mounted on a bottom mounting plate 175, as shown in FIG. 15, with bolts 177. The bottom mounting plate 175 closes the bottom of the drive opening 65. The bottom mounting plate 175 is mounted along one side to a carrying frame 181 in a felling head as will be described.

Figure 18:
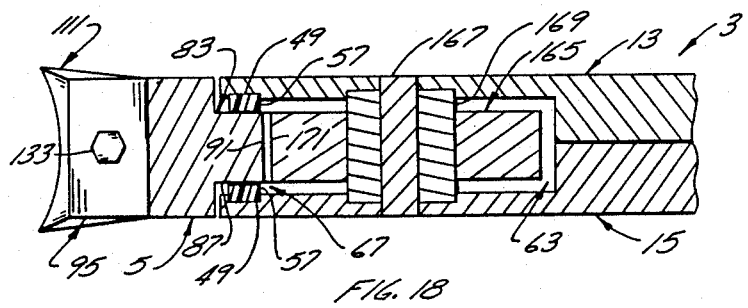
FIG. 18 is a cross-section view of the assembled saw.

The saw 1 is assembled, as shown in FIG. 18, by first placing the bearing strips 57 in each of the bearing grooves 49 in each of the top and bottom plates 13, 15. The bearing strips 57 are sized to be frictionally held in place in the grooves 49. The three idler gears 165 are next mounted on the bottom plate 15 as is the cutting 5 with the attached cutting teeth 111. The gear teeth 91 on the cutting ring flange 83 cooperate with the gear teeth 171 on the idler gears 165 to help center the cutting ring 5 on the saw body 3 and to maintain it centered during rotation. The cutting ring 5 is supported on the bearing strips 57 in the bottom plate 15 via the bottom side 87 of the flange 83. The top plate 13 is now attached to the bottom plate 15 with the bolts 61 with the idler gear shafts 167 supported by both plates 13, 15 and with the bearing strips 57 in the top plate 13 adjacent the top side 85 of the cutting ring flange 83. The annular mounting plate 139 is now mounted on the top of the top plate 13 to partially close the drive opening 65 and the motor 137 is then mounted on the mounting plate 139 with its drive shaft 145 in the drive opening 65. The drive gear 161 is next mounted on the drive shaft 145 in the drive opening 65 to mesh with the gear teeth 91 on the cutting ring 5. Finally, the assembled saw unit is mounted on the bottom mounting plate 175 with the bolts 177, the bottom mounting plate closing the drive opening 65.

In use, the motor 137 is operated to rotate the drive gear 161 within the drive opening 65. As the drive gear 161 is rotated, it rotates the cutting ring 5 via the gear teeth 91 on the flange 83 of the cutting ring 5. The flange 83 is located in the annular slot 67 formed between the top and bottom plates 13, 15 of the saw body 3. As the ring 5 rotates it is centered by the idler gears 165 in the guide pockets 63 in the saw body 3. The ring 5 is also supported by the bearing strips 57 in the grooves 49 which bear on the flange 83. As the ring 5 is being rotated, the saw 1 is also being moved into a tree so as to cut through it with the teeth 111 The teeth cut a kerf slightly wider than the saw body 3 so that the saw body fits in the kerf to be able to cut through the tree. Once the tree is cut through, the cut tree may rest on the saw for an instant until disposed of. This does not adversely affect the ring however since it is securely supported by the flange 83 in the slot 67 against the bearing strips.

Figure 19:
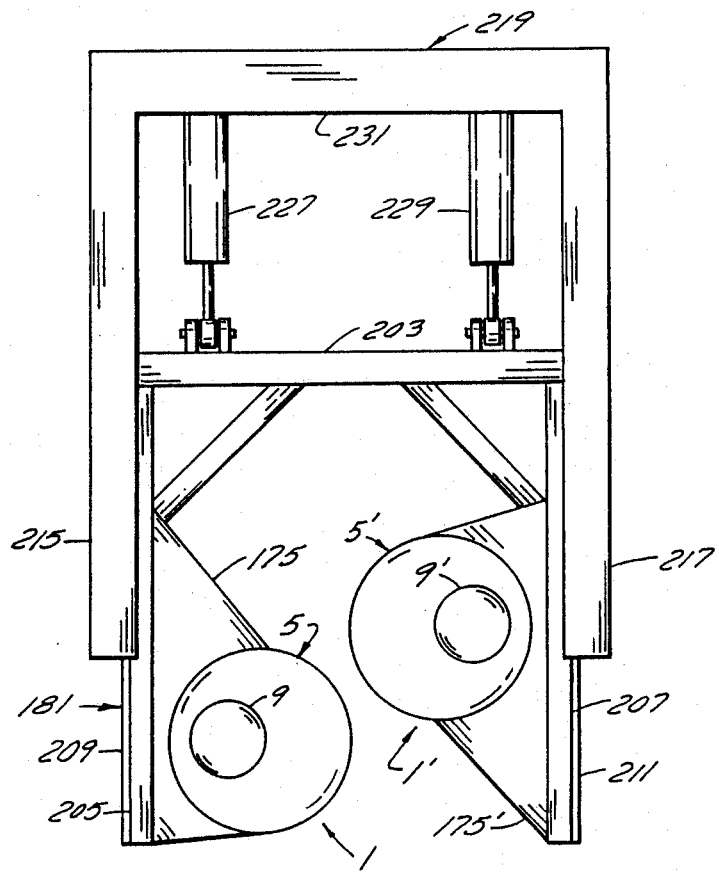
FIG. 19 is a plan view of a pair of saws mounted on a felling head.
Figure 20:
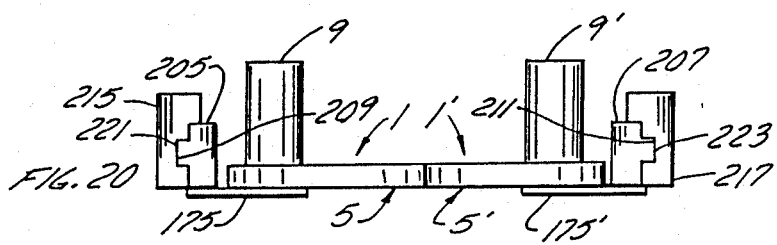
FIG. 20 is a front view of the saw mounting shown in FIG. 19.

The saw 1 can be employed as a single saw on a felling head of a tree harvester with suitable means to move the saw forward and rearward relative to the felling head. Preferably however two saws 1 are employed side-by-side, mounted in a movable frame, to cut a tree between them as the frame is moved forwardly. As shown in FIGS. 19 and 20, the frame 181 mounting the two saws 1, 1' is U-shaped having a base 203, and two parallel mounting arms 205, 207 extending forwardly from the ends of the base 203. Saws 1, 1' are mounted on the forward ends of the arms 205, 207 via their bottom mounting plates 175, 175' respectively. The saws are mounted with their motors 9, 9' located closely adjacent the arms 205, 207 so that the remainder of the saw bodies 5, 5' extend toward each other and can cut through a tree between them without interference from the motors. Each arm 205, 207 has a guide flange 209, 211 on its outer side.

The frame 201 is slidably mounted between a pair of support arms 215, 217 extending forwardly of the felling head 219 with the flanges 209, 211 on the mounting arms 205, 207 of the frame sliding in guide slots 221, 223 in the support arms 215, 217. A pair of hydraulic actuators 227, 229 is connected between the base 231 of the felling head 219 and the base 203 of the frame 201 for moving the frame 201 forwardly or rearwardly of the support arms 215, 217. As the frame 201 is moved forwardly, and the saws 1, 1' are operated by the motors 9, 9', a tree positioned centrally in front of the saws is cut through by the rotating rings 5, 5'.

Figure 21:
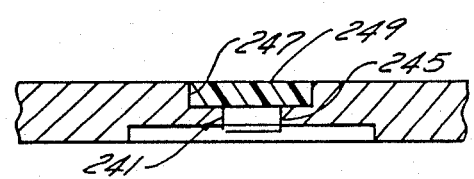
FIG. 21 is a cross-section view of a lubricating channel.

The top plate 13 of every saw body 3 preferably is provided with lubricating grooves 241 as shown in FIG. 2 extending from a lubricating station 243 adjacent the drive motor 9 to the countersunk portion 35 of each guide pocket 63, so as to conduct lubricating fluid to the bearing 169 of each idler gear 165. Each lubricating groove 241 is stepped to have an inner narrow lubricating channel 245 and an outer, wider cover receiving channel 247 as shown in FIG. 21. Cover strips 249 of plastic or other suitable material snugly fit in the cover channels 247 to close the lubricating channel 245.

Figure 22:
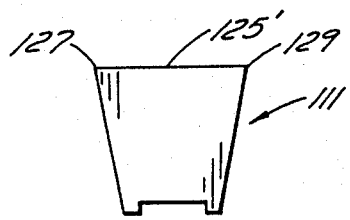
FIG. 22 is a front view of an alternative cutting tooth.

Each tooth 111 on the ring saw 5 has been described as having a curved cutting edge 125. However every second tooth on the cutting ring can be provided with a straight cutting edge 125' as shown in FIG. 22. The straight cutting edge 125' extends between the cutting corners 127, 129 and serves to clean out the chips cut by the preceding cutting tooth with a curved cutting edge.

I claim:

1. An improved ring saw having: a circular disk-shaped saw body; a cutting ring mounted about the circular, peripheral edge of the saw body; cutting teeth mounted on the cutting ring; drive means on the saw body for rotating the cutting ring about the saw body; the saw body having an annular slot in its peripheral edge that extends radially inwardly; the cutting ring having an annular, radially inwardly directed, flange on its inner circumferential surface that extends into the slot in the saw body; and driven means on tho inner surface of the flange that cooperate with the drive means on the saw body to rotate the ring.

2. An improved ring saw as claimed in claim 1 including bearing means fixedly mounted on the sides of the slot of the saw body for supporting a cutting ring by the sides of its flanges for rotation relative to the saw body.

3. An improved ring saw as claimed in claim 2 wherein the bearing means on each side of the slot comprise a set of bearing strips in the form of annular segments mounted in grooves in the saw body to form the shape of a broken ring.

4. An improved ring saw as claimed in claim 1 wherein the cutting teeth arc mounted on the outer, circumferential surface of the cutting ring.

5. An improved ring saw as claimed in claim 4 wherein the cutting ring has radial projections about its outer circumferential surface, the projections equally spaced apart about the ring, and means for mounting a cutting tooth against both the outer circumferential surface of the ring and the leading surface, in the direction of rotation of the ring, of each projection.

6. An improved ring saw as claimed in claim 5 wherein the leading surface of each projection extends at an angle of about seventy five degrees to the tangential line where the leading surface of each projection meets the circumferential outer surface of the ring.

7. An improved ring saw as claimed in claim 6 wherein each cutting tooth is fastened against the leading surface of each projection by a bolt passing through a tangential hole in each projection, the bolt passing through the projection from its trailing surface.

8. An improved ring saw as claimed in claim 2 wherein the drive means has a drive gear and idler gears mounted within the saw body and intersecting with the slot to cooperate with the driven means on the flange of the cutting ring.

9. An improved ring saw as claimed in claim 8 wherein the drive gear, the idler gear and the driven means on the flange of the ring gear are located within the bearing means.

10. An improved ring saw as claimed in claim 7 wherein each cutting tooth has a cutting edge slightly wider than the thickness of the cutting ring, the cutting edge being slightly concave.

11. A tree felling head having: a fixed frame; a movable frame slidably mounted on the fixed frame; the movable frame having a generally U-shape configuration defined by a pair of parallel arms joined by a base; a ring saw mounted on each arm and extending toward the other arm; each ring saw having a circular disk-shaped saw body; a cutting ring mounted about the circular peripheral edge of the saw body; cutting teeth mounted on the cutting ring; drive means on the saw body for rotating the cutting ring about the saw body; the saw body having an annular slot in its peripheral edge that extends radially inwardly; the cutting ring having an annular, radially inwardly directed, flange on its inner circumferential surface that extends into the slot in the saw body; and driven means on the inner surface of the flange that cooperate with the drive means on the saw body to rotate the ring; the ring saws aligned and overlapping; and means moving the movable frame forwardly on the fixed frame to have the two ring saws cut through a tree between them while their cutting rings are rotating.

* * * * *